(12) United States Patent
Martin

(10) Patent No.: X3711
(45) Date of Patent: Jun. 13, 1823

(54) FORK, FOUR TINED

(76) Inventor: Granville Martin

Granville Martin
Letters Patent

The Schedule referred to in these Letters Patent and making part of the same containing a descrip-tion in the words of the said Granville Martin himself. of his improvement in the method of making four tined or pronged forks for pitching dung diggin gardens and other uses.

Be it Known that I the said Granville Martin have invented and applied to use a new and useful improvement in the mode manner, and method of constructing and making four tined or pronged forks for pitching dung, dig-ging gardens and other uses This invention or im-provement consists principally in the mode of draw-ing the two middle tines, which I specify thus I take a bar of steel four or five inches long and having a shank on one end split the other into four strips turn off the two outside strips at right angles with the shank and draw the other two together in the same manner as though they had not been split into tines of the proper size required taking care not to heat them so as to weld the other tines are then drawn at right angles to the proper size the middle tines are then opened to the width required by a wedge or punch made for the purpose the side tines are then brought back to their place; the whole shaped and [illegible] for the use designed and then tempered like oth-er steel forks and are handled for the use required The principle of the improvement being to draw the middle tines together by the same [illegible]

very difficult if not impossible in any other way And in this way four tines are made with nearly as much facility as three These forks are found very useful for manure forks and may be used in the garden or for hay and many other purposes.

The mode and manner of operation may be seen & understood by the Models or Specimens of the work deposited in the Patent Office of the United States Dated at New Haven this 29th of May 1823

Exd. Simeon Baldwin } Witnesses Granville Martin
HCB Chs Bostwick }

Rec'd & Recorded anew 17 Dec 1831
No drawing – ( [illegible] )

DRAFTSMAN'S DIVISION.

*All communications should be addressed to*
"The Commissioner of Patents.
Washington, D. C."

**2—328 *a*.**

*DEPARTMENT OF THE INTERIOR,*

United States Patent Office,

*Washington, D. C., ............, 189...*

*SIR:*

*The printed* Copies *of Patent No.* G Martin are *exhausted.* June 13 1823

*As soon as printed a copy will be mailed you to complete your order.*

*By direction of the Commissioner:*

*Very respectfully,*

*Chief Clerk.*

31431b6-07-5m